(12) United States Patent
Lee

(10) Patent No.: US 9,454,184 B2
(45) Date of Patent: Sep. 27, 2016

(54) DETACHABLE ELECTRONIC DEVICE AND CONNECTION APPARATUS USABLE WITH THE SAME

(71) Applicant: Samsung Electronics Co., Ltd, Suwon-si, Gyeonggi-do (KR)

(72) Inventor: Myoung-ku Lee, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 106 days.

(21) Appl. No.: 14/478,102

(22) Filed: Sep. 5, 2014

(65) Prior Publication Data

US 2015/0192957 A1    Jul. 9, 2015

(30) Foreign Application Priority Data

Jan. 3, 2014    (KR) .................. 10-2014-0000911

(51) Int. Cl.
*H05K 5/00*    (2006.01)
*G06F 1/16*    (2006.01)

(52) U.S. Cl.
CPC .................. *G06F 1/1632* (2013.01)

(58) Field of Classification Search
CPC ... G06F 1/1632; G06F 1/1616; G06F 1/1669
See application file for complete search history.

(56) References Cited

U.S. PATENT DOCUMENTS

| | | | | |
|---|---|---|---|---|
| 8,721,356 B2* | 5/2014 | Webb | ..................... | G06F 1/1632 439/248 |
| 9,146,586 B2* | 9/2015 | Ho | ........................ | G06F 1/1616 |
| 9,274,577 B2* | 3/2016 | Lai | ........................ | G06F 1/266 |
| 2006/0035500 A1* | 2/2006 | Sugita | ................ | H01R 13/6315 439/247 |
| 2006/0105603 A1* | 5/2006 | Nishio | ............... | H01R 13/6315 439/247 |
| 2008/0057764 A1* | 3/2008 | Kuo | .................... | H01R 13/6315 439/248 |
| 2009/0303692 A1* | 12/2009 | Terlizzi | ................. | G06F 1/1632 361/810 |
| 2013/0005179 A1* | 1/2013 | Aldana | ............. | H01R 13/6315 439/529 |
| 2014/0133080 A1* | 5/2014 | Hwang | ................. | G06F 1/1632 361/679.17 |

* cited by examiner

*Primary Examiner* — Robert J Hoffberg
*Assistant Examiner* — Hung Dang
(74) *Attorney, Agent, or Firm* — Staas & Halsey LLP

(57)    ABSTRACT

A detachable electronic device includes a tablet computer and a peripheral apparatus where the tablet computer is detachably disposed. The detachable electronic device may include a connection apparatus disposed in the peripheral apparatus, the connection apparatus to which the tablet computer is detachably mounted; wherein the connection apparatus may include a base rotatably disposed in the peripheral apparatus; a male connector disposed in the base; a supporting member disposed below the male connector and elastically supporting the male connector upwardly; and a pair of hooks disposed at opposite sides of the male connector in the base, and wherein the tablet computer may include a female connector disposed in a side surface of the tablet computer and to be connected to the male connector; and a pair of push-push latches disposed to be coupled to the pair of hooks at opposite sides of the female connector.

20 Claims, 16 Drawing Sheets

DETACHABLE ELECTRONIC DEVICE AND CONNECTION APPARATUS USABLE WITH THE SAME

CROSS-REFERENCE TO RELATED APPLICATIONS

This application claims the benefit under 35 U.S.C. §119 (a) from Korean Patent Application No. 10-2014-0000911 filed Jan. 3, 2014, in the Korean Intellectual Property Office, the disclosure of which is incorporated herein by reference in its entirety.

BACKGROUND OF THE INVENTION

1. Field of the Invention

The present disclosure relates to a detachable electronic device including a tablet computer and a peripheral apparatus to which the tablet computer can be detachably mounted. More particularly, the present disclosure relates to a detachable electronic device including a connection apparatus that allows a tablet computer to be mounted to or removed from a peripheral apparatus by a single action, and the connection apparatus usable with the detachable electronic device.

2. Description of the Related Art

Recently, according as tablet computers have performance comparable to conventional laptop computers or desktop computers as well as convenient portability, the tablet computers have achieved remarkable growth. Accordingly, tablet computers having a variety of shapes and sizes are being released and sold.

The tablet computer is generally configured of only a screen and a main body for portability, and receiving data by only a touch. Accordingly, it is a trend that the tablet computer is provided with a peripheral apparatus having an input device such as a keyboard in order to increase the ease of use such as input of a large amount of data. Therefore, if using the tablet computer in connection with the peripheral apparatus, a user can perform specialized tasks performed by conventional notebook computers or desktop computers.

Such a peripheral apparatus may include a keyboard unit as an input device. In addition, the peripheral apparatus may include various devices to perform a variety of functions such as a charging unit, an auxiliary battery pack, a stand, etc.

Accordingly, the peripheral apparatus is equipped with a connection apparatus to which the tablet computer can be connected.

However, since a user connects or separates a tablet computer to or from a conventional connection apparatus by using both hands, there is a problem that it is difficult and inconvenient to use the conventional connection apparatus.

Therefore, there is a need to develop a connection apparatus to or from which a user can connect or separate a tablet computer with one hand, and a tablet computer and a peripheral apparatus to which the connection apparatus is applied.

SUMMARY OF THE INVENTION

The present disclosure provides features and utilities to overcome the above drawbacks and other problems associated with the conventional arrangement. The present disclosure also provides a detachable electronic device which is configured to allow a tablet computer to be easily mounted to or removed from a peripheral apparatus with one hand, and a connection apparatus usable with the detachable electronic device.

Additional features and utilities of the present general inventive concept will be set forth in part in the description which follows and, in part, will be obvious from the description, or may be learned by practice of the general inventive concept.

Exemplary embodiments of the present disclosure can substantially be achieved by providing a detachable electronic device that includes a tablet computer and a peripheral apparatus where the tablet computer is detachably disposed. The detachable electronic device may include a connection apparatus disposed in the peripheral apparatus, the connection apparatus to which the tablet computer is detachably mounted; wherein the connection apparatus may include a base rotatably disposed in the peripheral apparatus; a male connector disposed in the base; a supporting member disposed below the male connector and elastically supporting the male connector upwardly; and a pair of hooks disposed at opposite sides of the male connector in the base, and wherein the tablet computer may include a female connector disposed in a side surface of the tablet computer and to be connected to the male connector; and a pair of push-push latches disposed to be coupled to the pair of hooks at opposite sides of the female connector.

The connection apparatus may include a pair of guide protrusions disposed at opposite sides of the pair of hooks in the base.

The tablet computer may include a pair of guide grooves which is provided at opposite sides of the pair of push-push latches in the side surface of the tablet computer and is formed so that the pair of guide protrusions formed in the base is inserted into the pair of guide grooves.

The connection apparatus may include a pair of support wings which extends from opposite side surfaces of the base and forms a mounting groove into which one end of the tablet computer can be inserted.

The connection apparatus may include a cover having a size covering a docking portion of the base, and including holes corresponding to the male connector and the pair of hooks, the cover disposed to move up and down against the docking portion of the base.

At least one elastic member may be disposed between the cover and the docking portion of the base.

The connection apparatus may include a cover having a size covering a docking portion of the base, and including holes corresponding to the male connector, the pair of hooks, and the pair of guide protrusions, the cover disposed to move up and down against the docking portion of the base.

At least one elastic member may be disposed between the cover and the docking portion of the base.

The supporting member may include a supporting plate in which the male connector is disposed; a guide portion to guide the supporting plate to move up and down by a predetermined distance; and an elastic member elastically supporting the supporting plate in an upward direction.

The supporting plate may be formed in a size corresponding to a size of the docking portion of the base, and a pair of holes corresponding to the pair of hooks may be formed in the supporting plate.

The base may include a rotating portion provided with a pair of hinges rotatably disposed in the peripheral apparatus; and a docking portion extending from the rotating portion, the docking portion in which the male connector and the pair of hooks are disposed in a row.

Exemplary embodiments of the present disclosure can also be achieved by a connection apparatus usable with a detachable electronic device, where the connection apparatus may include a base; a pair of hinges rotatably disposed at opposite ends of the base; a male connector disposed in the base parallel to the pair of hinges; an elastic member disposed below the male connector, the elastic member to elastically support the male connector; and a pair of hooks disposed at opposite sides of the male connector in the base.

The connection apparatus may also include a pair of guide protrusions disposed at opposite sides of the pair of hooks in the base.

The connection apparatus may also include a cover having a size covering a docking portion of the base, and including holes corresponding to the male connector, the pair of hooks, and the pair of guide protrusions, the cover disposed to move up and down against the docking portion of the base.

The supporting member may include a supporting plate to which the male connector is fixed; a guide portion to guide the supporting plate to move up and down by a predetermined distance; and an elastic member elastically supporting the supporting plate in an upward direction.

The supporting plate may be formed in a size corresponding to a size of the docking portion of the base, and a pair of holes corresponding to the pair of hooks may be formed in the supporting plate.

The supporting plate may be formed in a size corresponding to a size of the docking portion of the base, and holes corresponding to the pair of hooks and the pair of guide protrusions may be formed in the supporting plate.

Exemplary embodiments of the present disclosure can also be achieved by providing a peripheral apparatus electronically attachable to a mobile display, the peripheral apparatus comprising: a base rotatably connected within a top portion of the peripheral apparatus via a pair of hinges extending at each end thereof; a supporting member disposed within the base and including a male connecter elastically connected to the supporting member and electronically connectable to a female connector of the mobile display; a hook assembly to connect with and disconnect from a push-push latching system disposed within the mobile display to attach and detach the peripheral apparatus to and from the mobile display.

In an exemplary embodiment, the base may further include fixing brackets extending from each of the hinges to fix the base to the peripheral apparatus; and a pair of guide protrusions surrounding the hook assembly to be inserted into corresponding guide grooves of the mobile device to support positioning of the mobile device with respect to the peripheral apparatus.

In an exemplary embodiment, the supporting member elastically supports the male connector upwardly such that when the male connector is inserted into the female connector the male connector is not moved in a downward direction, and when the mobile display is pushed downward the supporting member is moved by a predetermined distance in a downward direction by a same distance that the push-push latch is required to release the hook assembly and detach the mobile display.

In an exemplary embodiment, the pair of guide protrusions has a length shorter than the pair of guide grooves by an amount equal to a depth corresponding to the moving distance for release pressing of the push-push latch.

In an exemplary embodiment, the peripheral apparatus includes at least one of a keyboard unit, a charging stand, and auxiliary battery pack.

In an exemplary embodiment, the base may further include a rotating portion in which the hinges extend therefrom; and a docking portion including a cover formed as a rectangular container inserted therein and moves up and down with respect thereto and holes through which the mail connector, the pair of guide protrusions and the hook assembly extend therethrough.

In an exemplary embodiment, the peripheral apparatus may further include an installation groove provided at the top portion of the peripheral apparatus in which the base is rotatably disposed.

Other objects, advantages and salient features of the present disclosure will become apparent from the following detailed description, which, taken in conjunction with the annexed drawings, discloses preferred embodiments.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE PREFERRED EMBODIMENTS

Figure 1:
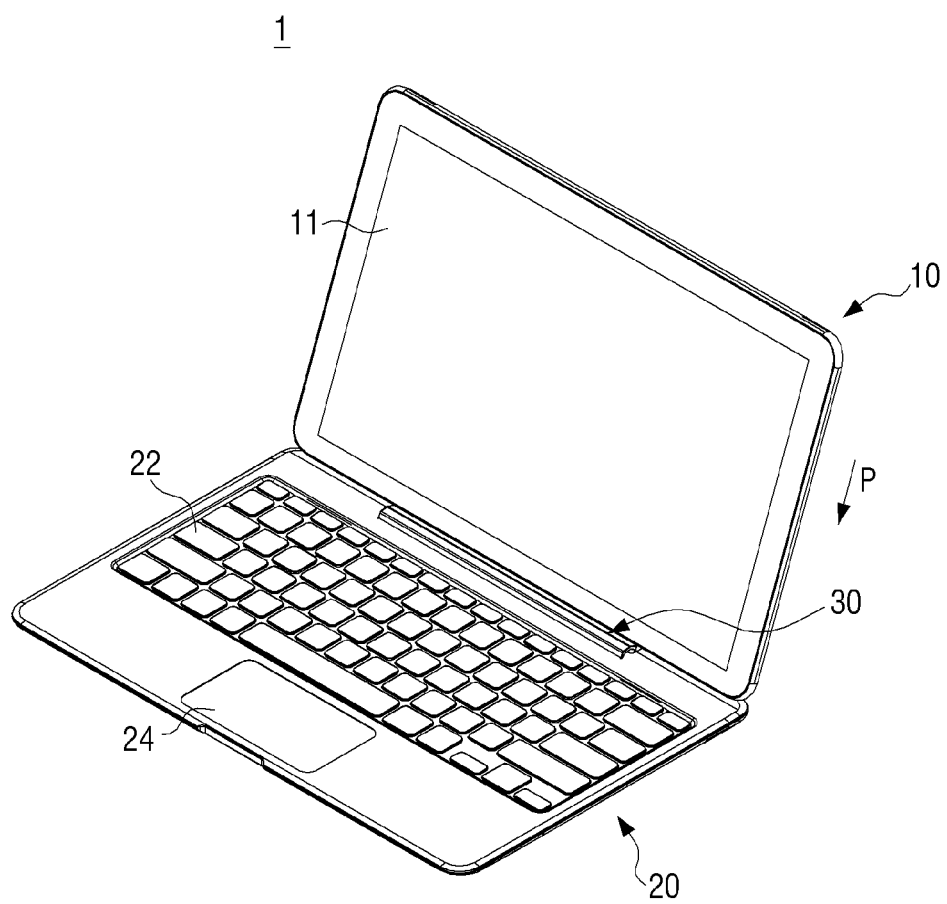
FIG. 1 is a perspective view illustrating a detachable electronic device according to an exemplary embodiment of the present disclosure of which a keyboard unit and a tablet computer are connected to each other.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 2:
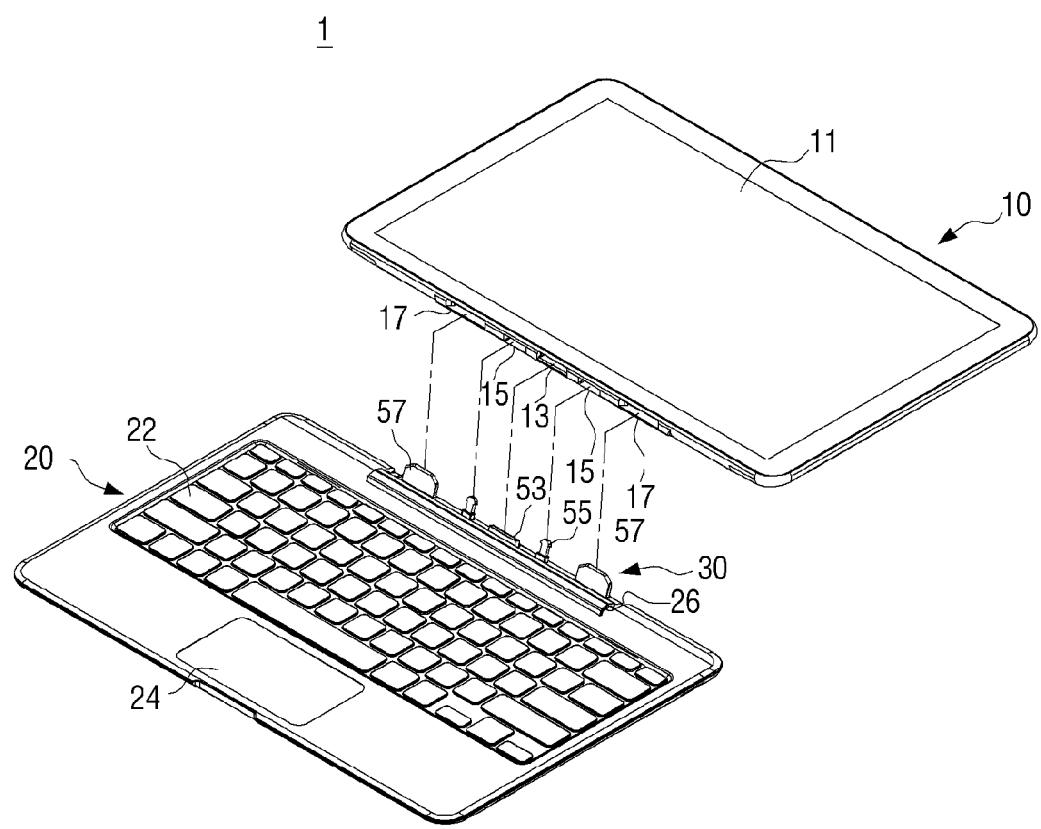
FIG. 2 is a perspective view illustrating a state in which a tablet computer is removed from a connection apparatus of a keyboard unit in the detachable electronic device of FIG. 1.

FIG. 1 is a perspective view illustrating a detachable electronic device according to an exemplary embodiment of the present disclosure of which a keyboard unit and a tablet computer are connected to each other, and FIG. 2 is a perspective view illustrating a state in which a tablet computer is removed from a connection apparatus of a keyboard unit in the detachable electronic device of FIG. 1.

Referring to FIGS. 1 and 2, the detachable electronic device 1 according to an embodiment of the present disclosure may include a tablet computer 10, a peripheral apparatus 20 configured so that the tablet computer 10 can be connected or removed to or from the peripheral apparatus 20 as necessary, and a connection apparatus 30 configured to connect the tablet computer 10 and the peripheral apparatus 20.

The tablet computer 10 is formed in a shape of a substantially rectangular plate, and a touch screen 11 is provided on a front surface of the tablet computer 10. As illustrated in FIG. 1, a female connector 13 and a pair of inserting grooves 15 are provided in one end of the tablet computer 10, namely, in one among four side surfaces of the tablet computer 10. The pair of inserting grooves 15 is provided at opposite sides of the female connector 13. A push-push latch 100 configured to fix a hook of the connection apparatus 30 is disposed inside each of the pair of inserting grooves 15. The female connector 13 is connected to a male connector 53 of the connection apparatus 30 that will be described later. Alternatively, the female connector 13 may be replaced by a connector groove. In this case, a plurality of contacts is provided on a bottom surface of the connector groove, and a pogo pin connector is used as the male connector 53 of the connection apparatus 30. A conventional board to board connector or the conventional pogo pin connector may be used as the connector which is used in the tablet computer 10 and the connection apparatus 30. Therefore, a detailed description thereof is omitted. In the present embodiment, a 40 pins board to board connector is used.

The peripheral apparatus 20 is an apparatus which is connected to and is used with the tablet computer 10 in order to increase usability of the tablet computer 10. A keyboard unit, a charging stand, an auxiliary battery pack, etc. may be used as the peripheral apparatus 20. In this embodiment, a case of using a keyboard unit as the peripheral apparatus 20 will be explained as an example.

A front surface of the peripheral apparatus 20 is provided with a keyboard 22 and a touch pad 24 that can input data into the tablet computer 10, and one side surface of the peripheral apparatus 20 is provided with an installation groove 26 in which the connection apparatus 30 is disposed. The keyboard 22 and the touch pad 24 are the same as or similar to keyboards and touch pads which are used in conventional notebook computers. Therefore, detailed descriptions thereof are omitted.

The connection apparatus 30 is rotatably disposed in the installation groove 26 of the one side surface of the peripheral apparatus 20, and allows the tablet computer 10 to be connected to the peripheral apparatus 20. When the tablet computer 10 is coupled to the connection apparatus 30, as illustrated in FIG. 1, the tablet computer 10 is fixed at a certain angle with respect to the peripheral apparatus 20.

Hereinafter, the connection apparatus 30 according to an exemplary embodiment of the present disclosure will be explained in detail with reference to FIGS. 3 through 5.

Figure 3:
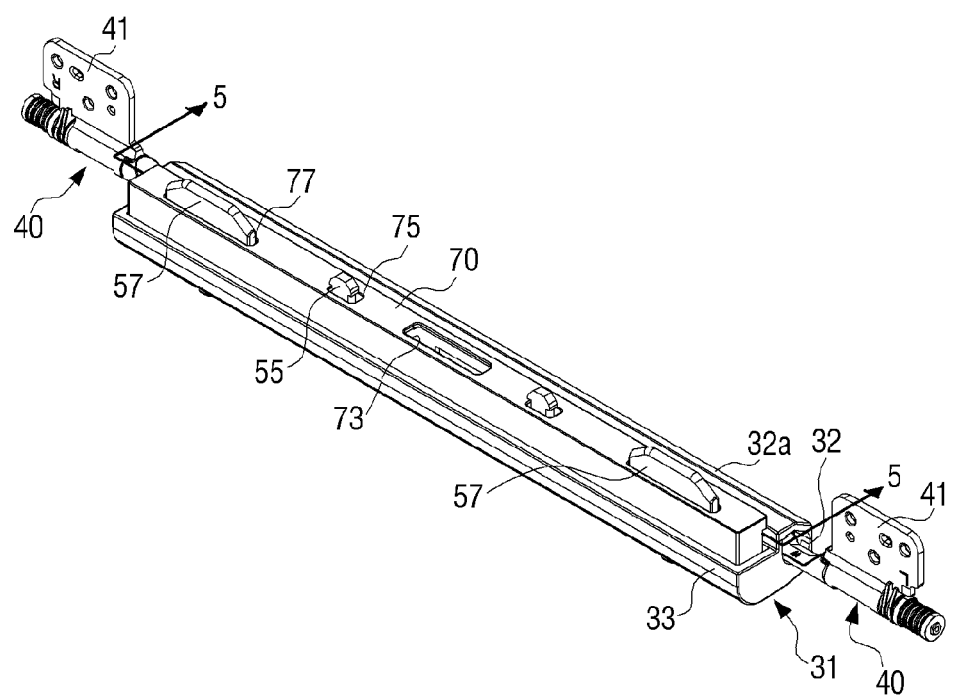
FIG. 3 is a perspective view illustrating a connection apparatus according to an exemplary embodiment of the present disclosure.
Figure 4:
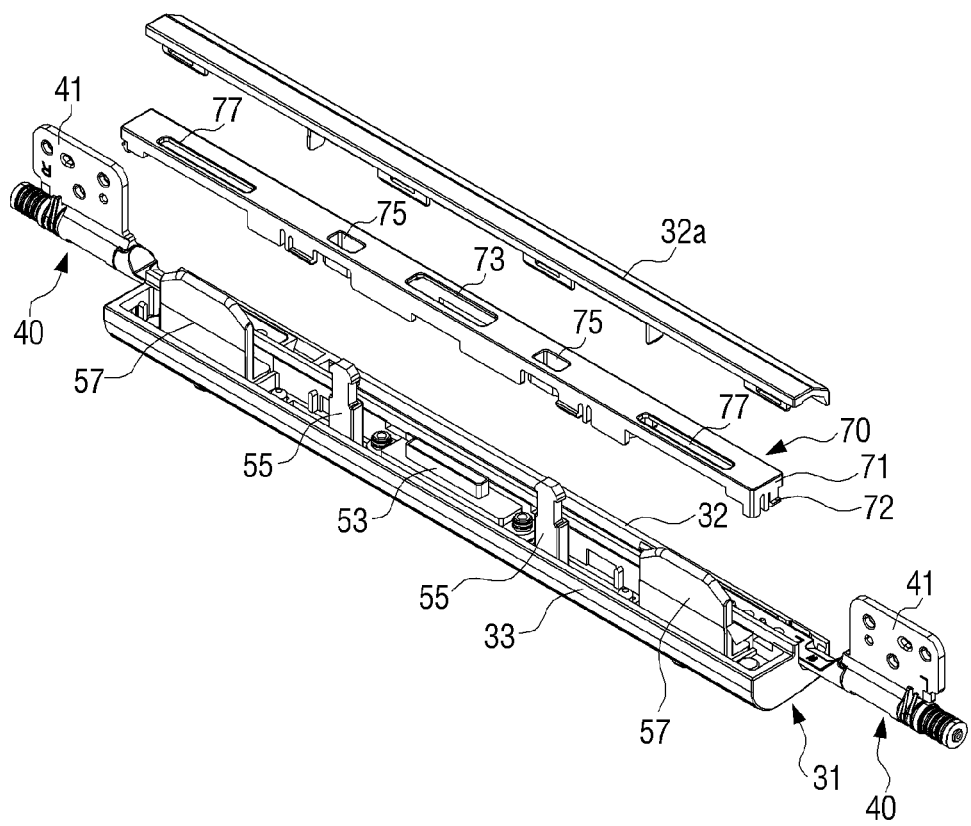
FIG. 4 is a perspective view illustrating the connection apparatus of FIG. 3 from which a cover is removed.

FIG. 3 is a perspective view illustrating a connection apparatus according to an exemplary embodiment of the present disclosure, and FIG. 4 is a perspective view illustrating the connection apparatus of FIG. 3 from which a cover is separated. FIG. 5 is a cross-sectional view illustrating the connection apparatus of FIG. 3 taken along a line 5-5.

Figure 5:
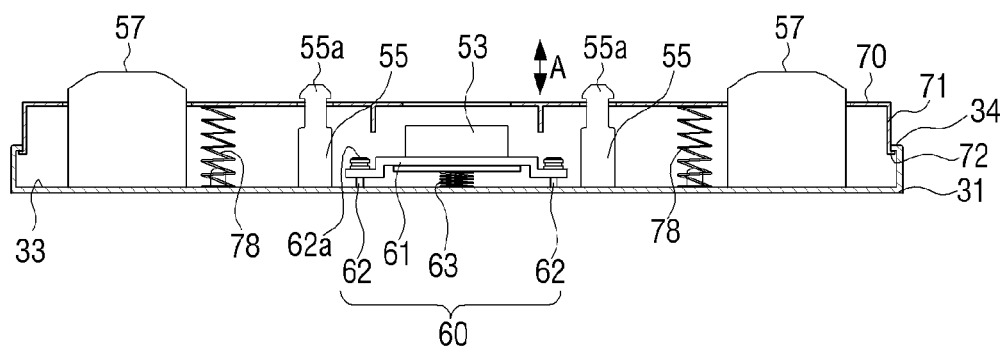
FIG. 5 is a cross-sectional view illustrating the connection apparatus of FIG. 3 taken along a line 5-5.

Referring to FIGS. 3 through 5, the connection apparatus 30 includes a base 31 which is rotatably disposed at the peripheral apparatus 20. The base 31 includes a rotating portion 32 which is rotatably disposed in the peripheral apparatus 20 and a docking portion 33 which is formed parallel to the rotating portion 32 and to which the tablet computer 10 is coupled.

The rotating portion 32 of the base 31 may be formed in an approximately U-shaped channel. A pair of hinges 40 is disposed at opposite ends of the rotating portion 32. An internal space of the rotating portion 32 of the base 31 may be used as a passage of wires or cables (not illustrated) connected to a male connector 53. As illustrated in FIG. 4, one end of the hinge 40 is secured onto a bottom surface of the rotating portion 32, and the other end of the hinge 40 is provided with a fixing bracket 41 to be fixed to the peripheral apparatus 20. Accordingly, if the fixing bracket 41 of each of the pair of hinges 40 is fixed to the peripheral apparatus 20, the base 31 is able to rotate about the peripheral apparatus 20. The structure and operation of the hinge 40 is the same as the structure and operation of hinges used in the conventional notebook computers, therefore, detailed descriptions with respect to the structure and operation of the hinge 40 are omitted.

The docking portion 33 of the base 31 is formed in a substantially rectangular shaped container parallel to the rotating portion 32. The male connector 53 and a pair of hooks 55 are disposed in a row on the bottom surface of the docking portion 33. The male connector 53 is disposed between the pair of hooks 55, and may be coupled to the female connector 13 of the tablet computer 10. Accordingly, the male connector 53 is selected with a specification corresponding to the female connector 13 of the tablet computer 10. For example, the male connector 53 may be a male connector of a 40 pins board-to-board connector.

A supporting member 60 which elastically supports the male connector 53 upwardly is disposed in the bottom surface of the docking portion 33 below the male connector 53. When the tablet computer 10 is mounted to the connection apparatus 30, namely, when the male connector 53 is inserted into the female connector 13 of the tablet computer 10, the male connector 53 disposed in the supporting member 60 is not moved in a downward direction. However, as illustrated in FIG. 1, when a user presses the tablet computer 10 in a downward direction (an arrow P) in order to remove the tablet computer 10 from the connection apparatus 30, the supporting member 60 is moved by a predetermined distance in a downward direction. At this time, a moving distance of the supporting member 60 is determined equal to a distance by which the push-push latch 100 is pressed once more to remove the tablet computer 10.

The supporting member 60 may include a supporting plate 61, a guide portion 62, and an elastic member 63. The supporting plate 61 is configured to support the male connector 53 and to move up and down. A moving distance of the supporting plate 61 is determined depending on a pressed distance required for release of the push-push latch 100 disposed in the tablet computer 10.

The guide portion 62 is configured to guide the supporting plate 61 to move up and down by a predetermined distance. In this embodiment, the guide portion 62 is formed as a pair of guide rods disposed on the bottom surface of the docking portion 33 of the base 31. Accordingly, a pair of guide holes into which the pair of guide rods 62 is inserted is formed in opposite end portions of the supporting plate 61 on which the male connector 53 is disposed.

The elastic member 63 is configured to press the supporting plate 61 upwardly, and when a force being applied to the male connector 53 is removed, the elastic member 63 restores the supporting plate 61 to an original position. The original position of the supporting plate 61 is determined by a length of the pair of guide rods 62, namely, a height of a head 62*a* of the guide rod 62. For example, a coil spring may be used as the elastic member 63. In the case of the supporting member 60 as illustrated in FIG. 5, a single elastic member 63 is disposed at a center of the supporting plate 61. Alternatively, although not illustrated, the elastic member 63 may be disposed in each of the pair of guide rods 62 so as to elastically support the supporting plate 61.

The pair of hooks 55 is disposed at opposite sides of the male connector 53 on the bottom surface of the docking portion 33 of the base 31. A head portion 55*a* of each of the pair of hooks 55 is formed in a shape of which can be coupled to the push-push latch 100 disposed in each of the pair of inserting grooves 15 of the tablet computer 10. In this embodiment, for example, the head portion 55*a* of the hook 55 may be formed in a trapezoidal shape. Accordingly, when the pair of hooks 55 is inserted into the pair of inserting grooves 15 of the tablet computer 10, the head portion 55*a* of the hook 55 is hooked to the push-push latch 100 so that tablet computer 10 is fixed to the connection apparatus 30.

A pair of guide protrusions 57 may be disposed on the bottom surface of the docking portion 33 of the base 31 to facilitate coupling of the tablet computer 10 to the connection apparatus 30 and to support the tablet computer 10. The pair of guide protrusions 57 is disposed at opposite sides of the pair of hooks 55 as described above and in line with the pair of hooks 55. Each of the pair of guide protrusions 57 is formed in a rectangular shape, and both corners of a leading end of the guide protrusion 57 are rounded. In this embodiment, the guide protrusions 57 are formed in the rectangular shape, but the shape of the guide protrusion 57 is not limited thereto. The guide protrusions 57 may be formed in a variety of shapes as long as the guide protrusions 57 can guide coupling of the tablet computer 10 to the connection apparatus 30 and support the tablet computer 10. The pair of guide protrusions 57 may be formed of a rigid material to support the tablet computer 10. For example, the pair of guide protrusions 57 may be formed of a metal.

If the pair of guide protrusions 57 is formed on the base 31 of the connection apparatus 30, the tablet computer 10 is provided with a pair of guide grooves 17 corresponding to the pair of guide protrusions 57. The pair of guide grooves 17 is provided at opposite sides of the pair of push-push latches 100 on one side surface of the tablet computer 10. The pair of guide grooves 17 is formed in a shape of which the pair of guide protrusions 57 formed on the base 31 can be inserted into and fixed to. In this embodiment, since the pair of guide protrusions 57 is formed in the rectangular shape, each of the pair of guide grooves 17 is also formed in a rectangular groove having a size corresponding to the size of the respective guide protrusion 57. Further, the pair of guide grooves 17 has a free space equal to a depth corresponding to the moving distance for release pressing of the push-push latch 100. Accordingly, when a user presses the tablet computer 10 downwardly once more in order to remove the tablet computer 10, the pair of guide protrusions 57 may be further inserted in the pair of guide grooves 17 of the tablet computer 10.

A cover 70 may be disposed to move up and down in the docking portion 33 of the base 31. The cover 70 may be formed in a rectangular container that can be inserted inside the docking portion 33 and move up and down with respect to the docking portion 33. The top surface of the cover 70 has a size capable of covering the bottom surface of the docking portion 33, and is provided with holes 73 and 75 through which the male connector 53 and the pair of hooks 55 can pass, respectively. Accordingly, the top surface of the cover 70 is provided with a first hole 73 corresponding to the male connector 53, and two second holes 75 corresponding to the pair of hooks 55. If the docking portion 33 of the base 31 is provided with the pair of guide protrusions 57, the top surface of the cover 70 is also provided with a pair of third holes 77 through which the pair of guide protrusions 57 can pass.

The cover 70 receives an urging force in an upward direction by elastic members 78 disposed below the cover 70, namely, between the top surface of the cover 70 and the bottom surface of the docking portion 33 of the base 31. The cover 70 may be supported by at least two elastic members 78. A coil spring may be used as the elastic member 78. Up and down movement of the cover 70 is guided by sidewalls 71 of the cover 70. Also, in order to prevent the cover 70 from being separated from the docking portion 33 of the base 31 by the urging force of the elastic member 78, a retaining projection 72 may be formed at an end of each of the opposite sidewalls 71 of the cover 70. In this case, a hook projection 34 to which the retaining projection 72 of the cover 70 is hooked may be provided in the corresponding sidewall of the docking portion 33 of the base 31. Accordingly, when an external force is not applied to the cover 70, as illustrated in FIG. 5, the cover 70 is elastically supported by the elastic members 78 so that the retaining projections 72 of the cover 70 are caught on the hook projections 34 of the docking portion 33 of the base 31. In another embodiment, the cover 70 may not be provided with the retaining projection 72. In this case, the length of the elastic member 78 may be adjusted so as to prevent the cover 70 from being removed from the docking portion 33 of the base 31.

When the tablet computer 10 is coupled to the base 31 of the connection apparatus 30, the cover 70 is pressed by the tablet computer 10 so that the male connector 53 projects outside the cover 70 through the first hole 73 and is coupled to the female connector 13 of the tablet computer 10. In other words, a state in which the tablet computer 10 is coupled to the connection apparatus 30 is a state in which the male connector 53 of the connection apparatus 30 is coupled to the female connector 13 of the tablet computer 10, the head portions 55*a* of the pair of hooks 55 of the connection apparatus 30 are caught by the pair of push-push latches 100 of the tablet computer 10, and the pair of guide protrusions 57 of the connection apparatus 30 is inserted in the pair of guide grooves 17 of the tablet computer 10. When separating the tablet computer 10, a user presses the tablet computer 10 once more in a downward direction (a direction of an arrow P in FIG. 1) so that the supporting member 60 supporting the male connector 53 is moved with the cover 70 in the downward direction by a predetermined distance and the push-push latches 100 of the tablet computer 10 release the hooks 55 so that the tablet computer 10 can be removed.

Figure 6:
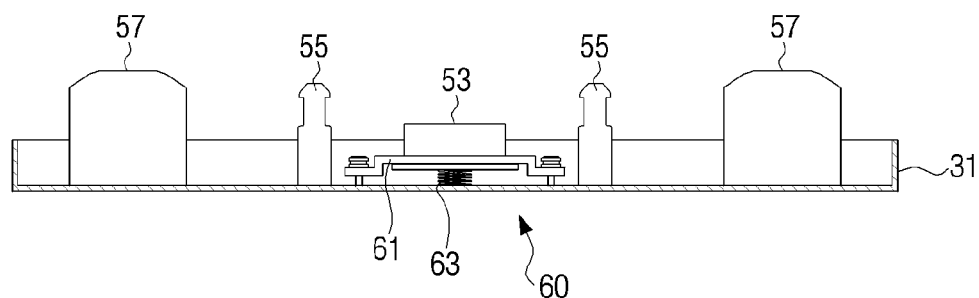
FIG. 6 is a cross-sectional view illustrating a connection apparatus according to another exemplary embodiment of the present disclosure.

As a connection apparatus 30' according to another exemplary embodiment, the cover 70 of the docking portion 33 may be removed from the base 31. The docking portion 33 of the base 31 with no cover 70 is illustrated in FIG. 6. The base 31 of the connection apparatus 30' according to another embodiment is different from the base 31 of the connection apparatus 30 according to an embodiment as described above in that the base 31 does not have the hook projection 34 on which the retaining projection 72 of the cover 70 is hooked. The structure of the base 31 except the hook projection 34 is the same as that of the base 31 of the connection apparatus 30 as described above. Also, a male connector 53, a supporting member 60, a pair of hooks 55, and a pair of guide protrusions 57 of the connection apparatus 30' according to the present embodiment of FIG. 6 are the same as those of the connection apparatus 30 according to an embodiment as described above. Therefore, detailed descriptions thereof are omitted.

Accordingly, when the tablet computer 10 is coupled to the connection apparatus 30' according to the present embodiment, the elastic member 63 below the supporting plate 61 is not compressed. In a state in which the tablet computer 10 is coupled to the connection apparatus 30', when a user presses the tablet computer 10 downwardly in order to remove the tablet computer 10 from the connection apparatus 30', the elastic member 63 below the supporting plate 61 is compressed so that the tablet computer 10 may be moved by a predetermined distance in a downward direction. Accordingly, the pair of hooks 55 of the connection apparatus 30' is released from the push-push latches 100 of the tablet computer 10.

A connection apparatus 301 according to still another embodiment may be formed so that the supporting plate 61 of the supporting member 60 elastically supporting the male connector 53 serves as the cover 70. The connection apparatus 301 according to this embodiment will be described in detail with reference to FIGS. 7 and 8.

Figure 7:
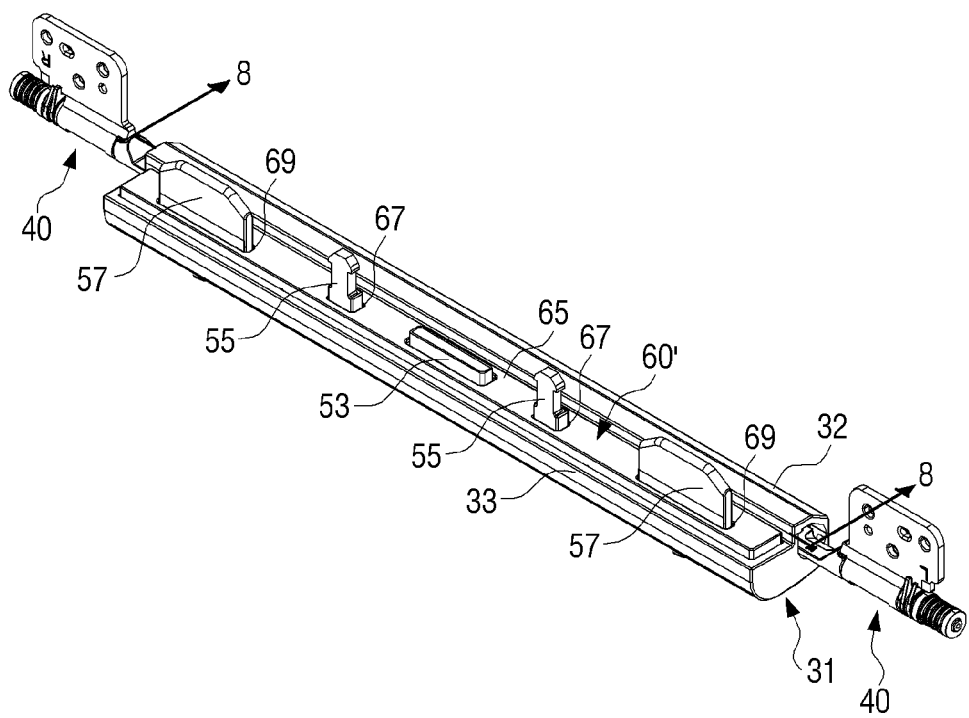
FIG. 7 is a perspective view illustrating a connection apparatus according to another exemplary embodiment of the present disclosure.
Figure 8:
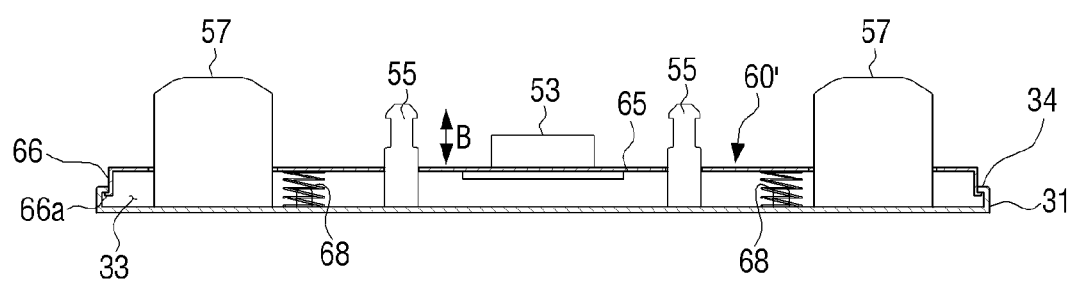
FIG. 8 is a cross-sectional view illustrating the connection apparatus of FIG. 7 taken along a line 8-8.

FIG. 7 is a perspective view illustrating the connection apparatus 301 according to still another exemplary embodiment of the present disclosure, and FIG. 8 is a cross-sectional view illustrating the connection apparatus 301 of FIG. 7 taken along a line 8-8.

Referring to FIG. 7, the connection apparatus 301 according to still another embodiment includes a base 31, a pair of hinges 40 disposed at a rotating portion 32 of the base 31, a male connector 53 disposed in a docking portion 33 of the base 31, a pair of hooks 55, and a pair of guide protrusions 57 which are the same as those of the connection apparatus 30 according to an embodiment as described above. Accordingly, descriptions thereof are omitted.

In the connection apparatus 301 according to this embodiment, a supporting member 60' elastically supporting the male connector 53 is different from the supporting member 60 of an embodiment as described above. The supporting member 60' according to this embodiment includes a supporting plate 65 on which the male connector 53 is disposed, a guide portion 66 extending from the supporting plate 65, and elastic members 68 urging the supporting plate 65 in an upward direction. The supporting plate 65 is formed in a size corresponding to the bottom surface of the docking portion 33 of the base 31, and the male connector 53 is disposed at a substantially center of the supporting plate 65. Holes 67 and 69 corresponding to the pair of hooks 55 and the pair of guide protrusions 57, respectively, are formed at opposite sides of the male connector 53 on the supporting plate 65. In other words, in this embodiment, the supporting plate 65 is provided with two hook holes 67 through which the pair of hooks 55 can pass and two guide protrusion holes 69 through which the pair of guide protrusions 57 can pass.

The guide portion 66 is configured to guide up and down movement of the supporting plate 65, and may be formed as sidewalls extending downwardly and vertically from opposite ends of the supporting plate 65. Alternatively, the guide portion 66 may be formed to extend vertically and downwardly from four sides of the supporting plate 65. A retaining projection 66*a* may be formed at one end of the guide portion 66 in order to prevent the supporting plate 65 from being separated from the docking portion 33 of the base 31. In this case, the docking portion 33 of the base 31 is provided with hook projections 34 on which the retaining projections 66*a* of the guide portion 66 are caught.

The elastic member 68 applies an elastic force so that the supporting plate 65 is urged in an upward direction. At least two coil springs may be used as the elastic member 68. Since the movement distance of the supporting plate 65 is to release the tablet computer 10, the movement distance is determined depending on a distance corresponding to a pressing action for releasing the push-push latch 100 disposed in the tablet computer 10. For example, if, when the push-push latch 100 is further pressed approximately 2 mm in a state in which the push-push latch 100 catches the hook 55, the push-push latch 100 releases the hook 55, the movement distance of the supporting plate 65 may be determined as 2 mm.

Figure 16:
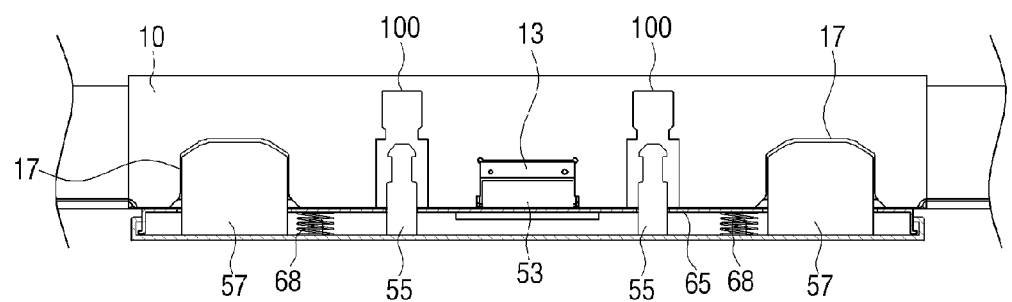
FIG. 16 is a cross-sectional view illustrating a docking portion of a base when a tablet computer is pressed downwardly one more time in order to remove the tablet computer from the connection apparatus of FIG. 7.

Accordingly, when the tablet computer 10 is coupled to the connection apparatus 301 of FIG. 7, in a state in which the supporting plate 65 is not moved downwardly, the male connector 53, the pair of hooks 55, and the pair of guide protrusions 57 of the connection apparatus 301 are coupled to the female connector 13, the pair of push-push latches 100, and the pair of guide grooves 17 of the tablet computer 10. When a user wants to remove the tablet computer 10 from the connection apparatus 301 to which the tablet computer 10 is coupled, the user presses the tablet computer 10 in a downward direction. Thus, as illustrated in FIG. 16, the supporting plate 65 is moved by a predetermined distance in a downward direction by the tablet computer 10 so that the push-push latches 100 of the tablet computer 10 release the hooks 55. Accordingly, the user can separate the tablet computer 10 from the connection apparatus 301.

Figure 9:
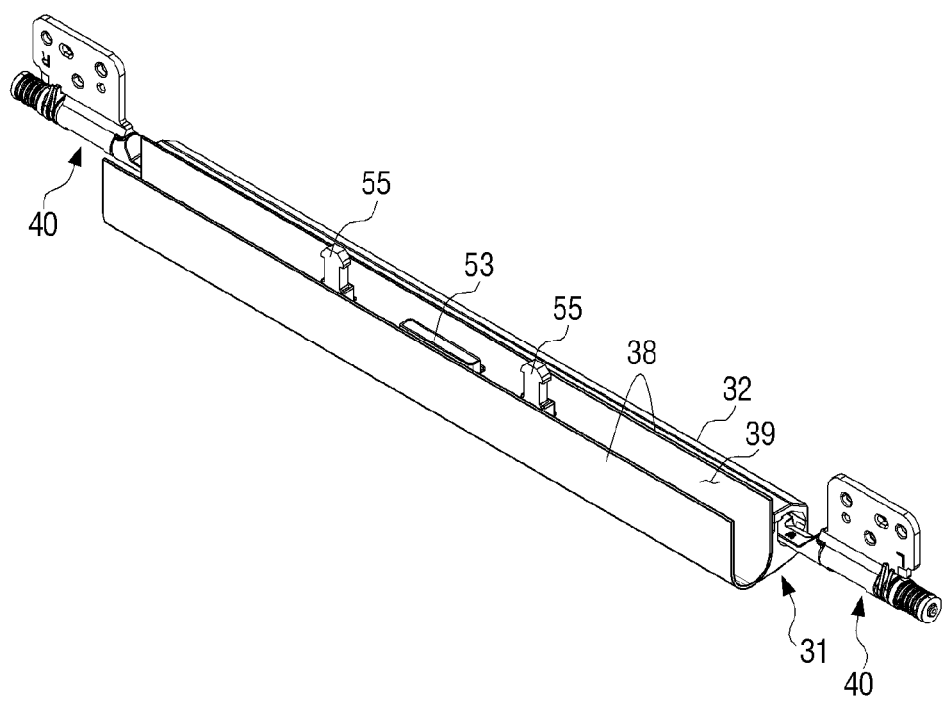
FIG. 9 is a perspective view illustrating a connection apparatus according to another exemplary embodiment of the present disclosure.

FIG. 9 is a perspective view illustrating a connection apparatus 302 according to another exemplary embodiment of the present disclosure. The connection apparatus 302 as illustrated in FIG. 9 is different in a shape of a base 31 from the connection apparatuses according to embodiments as described above.

Referring to FIG. 9, the base 31 includes a pair of support wings 38 extending from opposite side surfaces of the docking portion. The pair of support wings 38 forms a mounting groove 39 in which one end of the tablet computer 10 is able to be inserted, and supports the tablet computer 10. Accordingly, the pair of support wings 38 performs a function corresponding to the pair of guide protrusions 57 according to an embodiment as described above. In a bottom surface of the mounting groove 39 are disposed a male connector 53, a supporting member 60 (not shown), and a pair of hooks 55. The male connector 53, supporting member 60, and pair of hooks 55 of the connection apparatus 302 according to this embodiment are the same as the male connector 53, supporting member 60, and pair of hooks 55 of the connection apparatus 30 according to an embodiment as described above. Therefore, detailed descriptions thereof are omitted. However, since the pair of support wings 38 serves as the pair of guide protrusions 57 according to an embodiment as described above, the connection apparatus 302 according to this embodiment does not need the pair of guide protrusions 57.

Hereinafter, a connection structure provided in the tablet computer 10 which can be coupled to the docking portion 33 of the connection apparatus 30, 30', and 301 will be explained in detail with reference to FIGS. 10 through 13.

Figure 10:
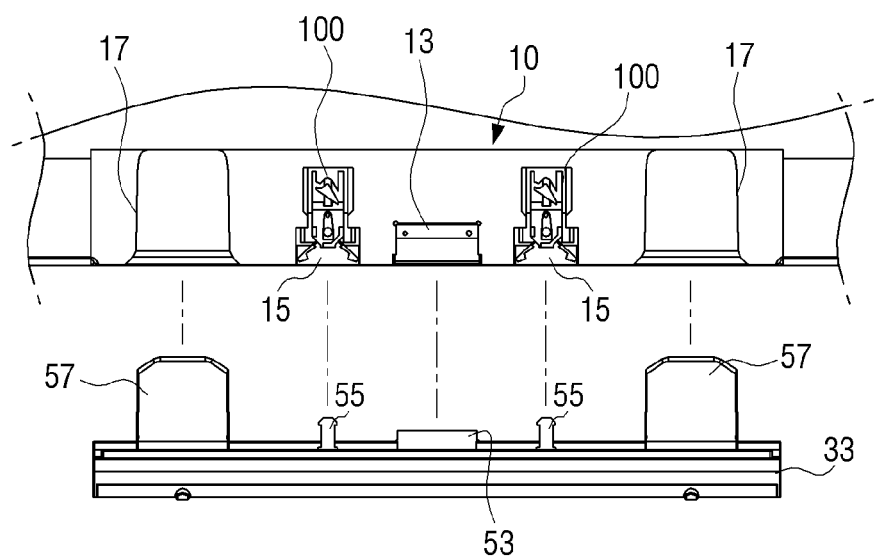
FIG. 10 is a partial cross-sectional view illustrating portions of a tablet computer and a docking portion of a base before the tablet computer is coupled to a connection apparatus according to an exemplary embodiment of the present disclosure.
Figure 11:
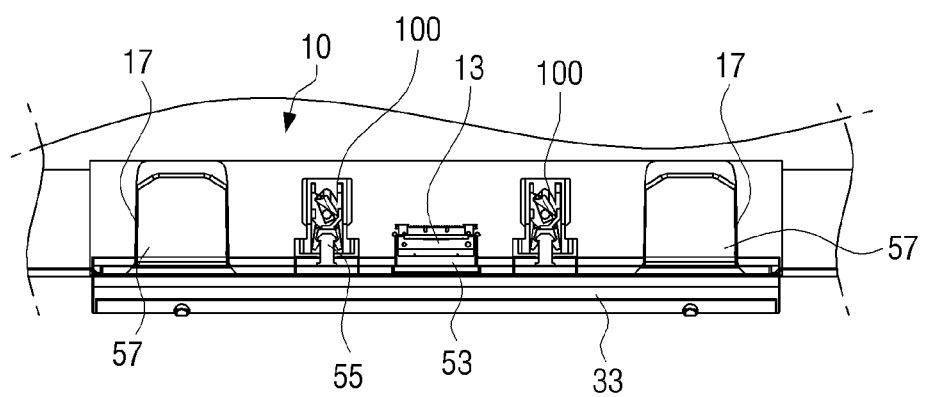
FIG. 11 is a partial cross-sectional view illustrating portions of a tablet computer and a docking portion of a base when the tablet computer is coupled to a connection apparatus according to an exemplary embodiment of the present disclosure.
Figure 12:
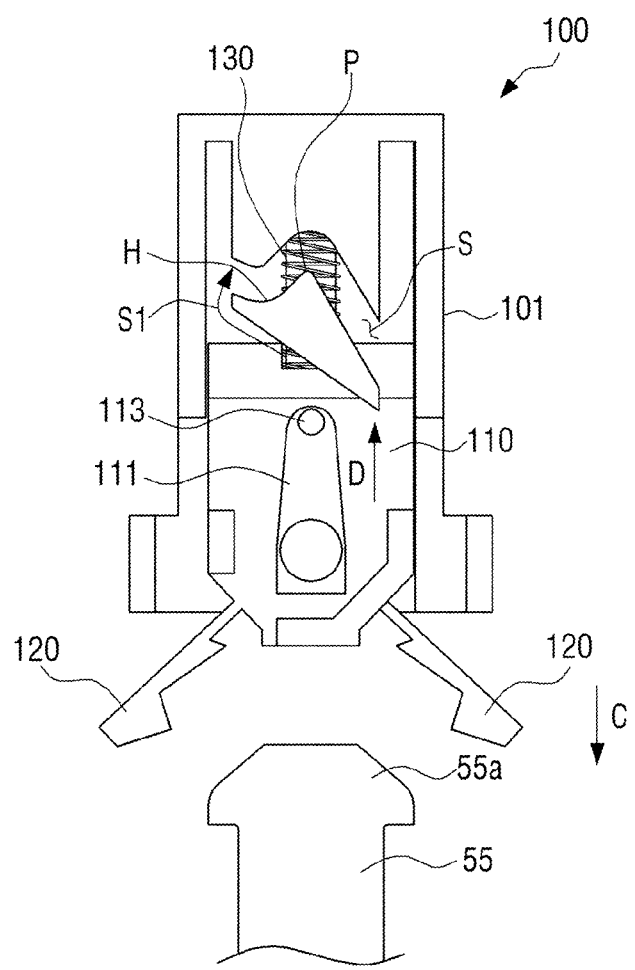
FIG. 12 is a partial cross-sectional view illustrating a push-push latch of a tablet computer according to an exemplary embodiment of the present disclosure.
Figure 13:
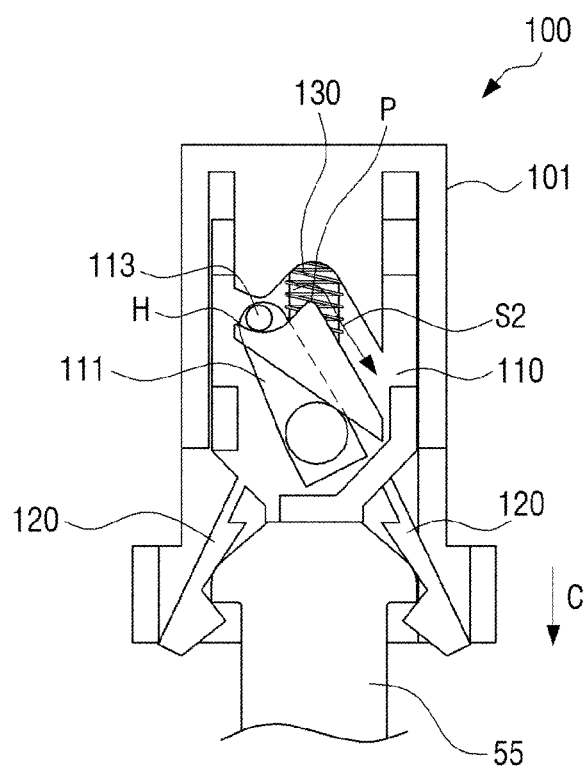
FIG. 13 is a partial cross-sectional view illustrating a state in which a hook of a connection apparatus is coupled to the push-push latch of FIG. 12.

FIG. 10 is a partial cross-sectional view illustrating portions of a tablet computer and a docking portion of a base before the tablet computer is connected to a connection apparatus according to an exemplary embodiment of the present disclosure, and FIG. 11 is a partial cross-sectional view illustrating portions of a tablet computer and a docking portion of a base when the tablet computer is connected to a connection apparatus according to an exemplary embodiment of the present disclosure. FIG. 12 is a partial cross-sectional view illustrating a push-push latch of a tablet computer according to an exemplary embodiment of the present disclosure, and FIG. 13 is a partial cross-sectional view illustrating a state in which a hook of a connection apparatus is caught by the push-push latch of FIG. 12.

As illustrated in FIGS. 2 and 10, the female connector 13, the pair of inserting grooves 15, and the pair of guide grooves 17 are formed in one side surface of the tablet computer 10 which is able to be coupled to the docking portion 33 of the connection apparatus 30. The female connector 13 couples to the male connector 53 of the connection apparatus 30 so that the peripheral apparatus 20 and the tablet computer 10 can send and receive signals or power to and from each other. The pair of guide grooves 17 is formed in a shape corresponding to the pair of guide protrusions 57 of the connection apparatus 30. As illustrated in FIG. 11, when the pair of guide protrusions 57 is inserted into the pair of guide grooves 17, the pair of guide protrusions 57 allows the tablet computer 10 to be fixed to the connection apparatus 30.

The push-push latch 100 is disposed in each of the pair of inserting grooves 15. When the push-push latch 100 is pressed once, the push-push latch 100 holds the head portion 55a of the hook 55 so that the tablet computer 10 is coupled to the connection apparatus 30. When the push-push latch 100 is pressed again, the push-push latch 100 releases the head portion 55a of the hook 55 so that the tablet computer 10 can be removed from the connection apparatus 30. When the tablet computer 10 is coupled to the docking portion 33 of the connection apparatus 30, as illustrated in FIG. 11, the head portions 55a of the pair of hooks 55 of the docking portion 33 are caught by the pair of push-push latches 100.

Hereinafter, operation of the push-push latch 100 will be described in detail with reference to FIGS. 12 and 13.

Referring to FIG. 12, the push-push latch 100 includes a housing 101, a moving portion 110, and a spring 130. The housing 101 has an open lower end so that the moving portion 110 can be inserted into the housing 101, and guides up and down movement of the moving portion 110. A substantially S-shaped guide path S is formed in one side wall of the housing 101. The moving portion 110 is disposed to move up and down inside the lower portion of the housing 101. Two arms 120 that can catch the head portion 55a of the hook 55 are provided in the lower portion of the moving portion 110. A link 111 is disposed on a side surface of the moving portion 110. One end of the link 111 is rotatably disposed in the moving portion 110. A guide pin 113 is provided at the other end of the link 111, and is disposed to swing a predetermined angle with respect to the moving portion 110. Accordingly, when the moving portion 110 moves, the guide pin 113 of the link 111 may move along the guide path S of the housing 101. The spring 130 is disposed between a top end of the housing 101 and a top end of the moving portion 110, and applies an urging force in a downward direction to the moving portion 110.

As illustrated in FIG. 12, before the hook 55 is inserted into the push-push latch 100, the two arms 120 of the moving portion 110 are spread, and the link 111 of the moving portion 110 is in a vertical state. In this state, if a user inserts the tablet computer 10 into the connection apparatus 30, the head portion 55a of the hook 55 of the connection apparatus 30 is in contact with a lower end of the moving portion 110 between the two arms 120. If the tablet computer 10 continues to move down in a direction of an arrow C, the moving portion 110 is moved upward (a direction of an arrow D) while compressing the spring 130 by the hooks 55 so that the two arms 120 are inserted into the inside of the housing 101 and holds the head portion 55a of the hook 55 as illustrated in FIG. 13. Also, when the moving portion 110 is moved upward, the guide pin 113 of the link 111 is moved upward along a first path S1 of the guide path S, which is upwardly inclined, and is placed in a groove H of the guide path S. When the guide pin 113 of the link 111 is placed in the groove H of the guide path S, as illustrated in FIG. 13, the head portion 55a of the hook 55 of the connection apparatus 30 is caught by the push-push latch 100. Accordingly, even when the tablet computer 10 is pulled, the tablet computer 10 is not removed from the connection apparatus 30.

In a state in which the push-push latches 100 hold the hooks 55 as illustrated in FIG. 13, if the push-push latch 100 is further pressed in a downward direction as an arrow C, the guide pin 113 of the link 111 is moved from the groove H of the guide path S over a projecting portion P to a second path S2 which is downwardly inclined. At this time, after the guide pin 113 of the link 111 goes over the projecting portion P of the guide path S, the moving portion 110 receives a downward force by the spring 130, thereby moving in a downward direction. Then, the two arms 120 escape from the housing 101, and release the hook 55 as illustrated in FIG. 12. Accordingly, the user can remove the tablet computer 10 from the connection apparatus 30.

Hereinafter, operations of mounting and removing a tablet computer of a detachable electronic device according to an exemplary embodiment of the present disclosure to and from the connection apparatus 30 of a peripheral apparatus 20 will be described in detail with reference to FIGS. 1, 2, 5, 14 and 15.

Figure 14:
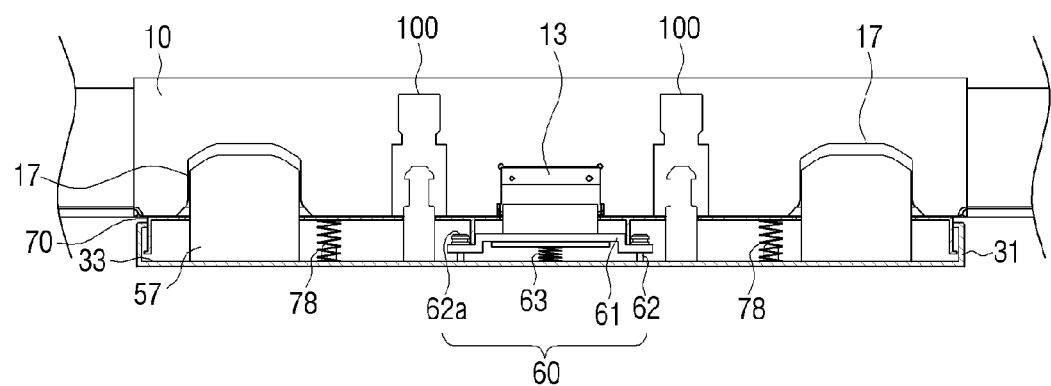
FIG. 14 is a cross-sectional view illustrating a docking portion of a base when a tablet computer is connected to the connection apparatus of FIG. 5.
Figure 15:
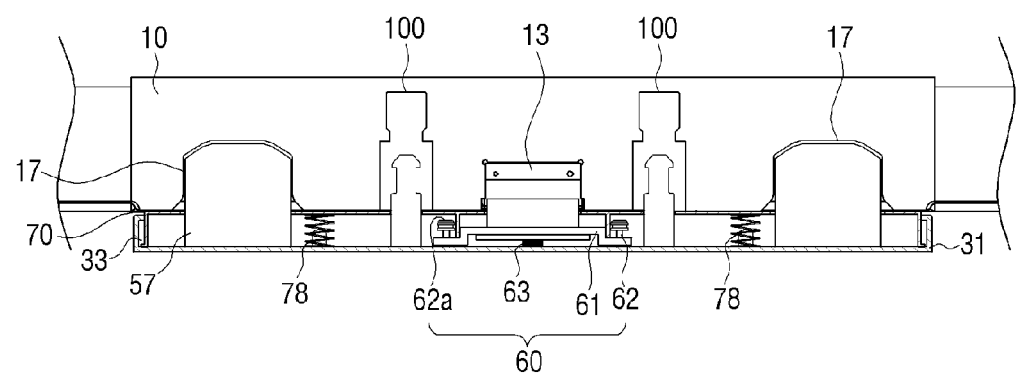
FIG. 15 is a cross-sectional view illustrating a docking portion of a base when a tablet computer is pressed downwardly one more time in order to remove the tablet computer from the connection apparatus of FIG. 14.

FIG. 14 is a cross-sectional view illustrating a docking portion of a base when a tablet computer is connected to the connection apparatus of FIG. 5, and FIG. 15 is a cross-sectional view illustrating a docking portion of a base when a tablet computer is pressed in a downward direction one more time in order to remove the tablet computer from the connection apparatus of FIG. 14.

First, coupling the tablet computer 10 to the connection apparatus 30 of the peripheral apparatus 20 is described.

In a state in which the tablet computer 10 is separated from the connection apparatus 30 of the peripheral apparatus 20 as illustrated in FIG. 2, a user aligns the pair of guide grooves 17 of the tablet computer 10 with the pair of guide protrusions 57 of the connection apparatus 30, and then presses the tablet computer 10 in a downward direction. As a result, the cover 70 of the connection apparatus 30 is moved downward by the side surface of the tablet computer 10, and the pair of guide protrusions 57 of the connection apparatus 30 is deeply inserted into the pair of guide grooves 17 of the tablet computer 10. Also, the pair of hooks 55 of the connection apparatus 30 is inserted into the pair of inserting grooves 15 so that the head portions 55a of the hooks 55 are caught by the pair of arms 120 of the push-push latches 100 disposed in the inserting grooves 15, as illustrated in FIG. 13. Accordingly, the tablet computer 10 is coupled to the connection apparatus 30, as illustrated in FIG. 1. At this time, the male connector 53 of the connection apparatus 30 is connected to the female connector 13 of the tablet computer 10. However, the supporting member 60, which elastically supports the male connector 53 of the connection apparatus 30, is not pressed by the tablet computer 10. In this state, even if a user pulls the tablet computer 10 in an upward direction, the tablet computer 10 will not be removed from the connection apparatus 30.

In a state of FIG. 1, when a user wants to remove the tablet computer 10 from the connection apparatus 30, the user presses the tablet computer 10 in a downward direction (a direction of an arrow P) once more. Then, as illustrated in FIG. 15, the cover 70 is moved in a downward direction by the tablet computer 10 so that the supporting plate 65 of the supporting member 60 is moved in the downward direction. If the supporting plate 65 is moved in the downward direction, the moving portion 110 (see FIG. 13) of the push-push latch 100 of the tablet computer 10 may be further moved upwardly by the head portion 55a of the hook 55 as much as a moving distance of the supporting plate 65 so that the push-push latches 100 release the hooks 55 as described above. Accordingly, the user can remove the tablet computer 10 from the connection apparatus 30.

When using a connection apparatus 30 according to exemplary embodiments of the present disclosure, a user may mount the tablet computer 10 to the connection apparatus 30 with one hand. Also, when removing the tablet computer 10 from the connection apparatus 30, the user may remove the tablet computer 10 from the connection apparatus 30 by pressing the tablet computer 10 in a downward direction once, also with one hand. Therefore, the user can attach and remove the tablet computer 10 from the connection apparatus 30 by using only one hand. In other words, since a user can mount or remove the tablet computer 10 to or from the peripheral apparatus 20 with one hand, the detachable electronic device 1 using a connection apparatus 30 according to exemplary embodiments of the present disclosure is easy and convenient to use.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic device comprises a tablet computer and a peripheral apparatus, the tablet computer being attachable to and detachable from the peripheral apparatus, the electronic device comprising:
   a connection apparatus disposed in the peripheral apparatus attachable to and detachable from the tablet computer, the connection apparatus including:
   a base rotatably disposed in the peripheral apparatus;
   a supporting member disposed on the base;
   a male connector disposed above the supporting member so that the supporting member elastically supports the male connector upwardly; and
   a pair of hooks disposed at opposite sides of the male connector in the base, and
   wherein the tablet computer comprises:
   a female connector disposed in a side surface of the tablet computer and to be connected to the male connector; and
   a pair of push-push latches disposed at opposite sides of the female connector, each of the pair of push-push latches comprising two arms to catch or release a head portion of each of the pair of hooks to attach to or detach from the connecting apparatus, respectively.

2. The electronic device of claim 1, wherein
the connection apparatus comprises a pair of guide protrusions disposed at opposite sides of the pair of hooks in the base.

3. The electronic device of claim 2, wherein
the tablet computer comprises a pair of guide grooves which is provided at opposite sides of the pair of push-push latches in the side surface of the tablet computer and is formed so that the pair of guide protrusions formed in the base is inserted into the pair of guide grooves.

4. The electronic device of claim 1, wherein
the connection apparatus comprises a pair of support wings which extends from opposite side surfaces of the base and forms a mounting groove into which one end of the tablet computer can be inserted.

5. The electronic device of claim 1, wherein
the connection apparatus further comprises a cover having a size covering a docking portion of the base, and including holes corresponding to the male connector and the pair of hooks, the cover disposed to move up and down against the docking portion of the base.

6. The electronic device of claim 5, wherein
at least one elastic member is disposed between the cover and the docking portion of the base.

7. The electronic device of claim 2, wherein
the connection apparatus further comprises a cover having a size covering a docking portion of the base, and including holes corresponding to the male connector, the pair of hooks, and the pair of guide protrusions, the cover disposed to move up and down against the docking portion of the base.

8. The electronic device of claim 7, wherein
at least one elastic member is disposed between the cover and the docking portion of the base.

9. The electronic device of claim 1, wherein
the supporting member comprises:
a supporting plate in which the male connector is disposed;
a guide portion to guide the supporting plate to move up and down by a predetermined distance; and
an elastic member elastically supporting the supporting plate in an upward direction.

10. The electronic device of claim 9, wherein
the supporting plate is formed in a size corresponding to a size of the docking portion of the base, and a pair of holes corresponding to the pair of hooks is formed in the supporting plate.

11. The electronic device of claim 1, wherein the base comprises:
a rotating portion provided with a pair of hinges rotatably disposed in the peripheral apparatus; and
a docking portion extending from the rotating portion, the docking portion in which the male connector and the pair of hooks are disposed in a row.

12. A connection apparatus usable with an electronic device comprising a tablet computer and a peripheral apparatus, the tablet computer being attachable to and detachable from the peripheral apparatus via the connection apparatus, the connection apparatus comprising:
a base;
a pair of hinges rotatably disposed at opposite ends of the base;
a male connector disposed in the base parallel to the pair of hinges;
a supporting member disposed on the base and below the male connector, the supporting member to elastically support the male connector upwardly; and
a pair of hooks disposed at opposite sides of the male connector in the base to be caught by push-push latches of the electronic device to attach to the connecting apparatus.

13. The connection apparatus of claim 12, further comprising:
a pair of guide protrusions disposed at opposite sides of the pair of hooks in the base.

14. The connection apparatus of claim 13, further comprising:
a cover having a size covering a docking portion of the base, and including holes corresponding to the male connector, the pair of hooks, and the pair of guide protrusions, the cover disposed to move up and down against the docking portion of the base.

15. The connection apparatus of claim 12, wherein
the supporting member comprises:
a supporting plate to which the male connector is fixed;
a guide portion to guide the supporting plate to move up and down by a predetermined distance; and
an elastic member elastically supporting the supporting plate in an upward direction.

16. The connection apparatus of claim of 15, wherein
the supporting plate is formed in a size corresponding to a size of the docking portion of the base, and a pair of holes corresponding to the pair of hooks is formed in the supporting plate.

17. The connection apparatus of claim 13, wherein
the supporting member comprises:
a supporting plate to which the male connector is fixed;
a guide portion to guide the supporting plate to move up and down by a predetermined distance; and
an elastic member elastically supporting the supporting plate in an upward direction.

18. The connection apparatus of claim of 17, wherein
the supporting plate is formed in a size corresponding to a size of the docking portion of the base, and holes corresponding to the pair of hooks and the pair of guide protrusions are formed in the supporting plate.

19. A peripheral apparatus electronically attachable to and detachable from a mobile display, the peripheral apparatus comprising:
a base rotatably connected within a top portion of the peripheral apparatus via a pair of hinges extending at each end thereof;
a supporting member disposed on the base and including a male connector fixed to the supporting member and electronically connectable to a female connector of the mobile display, the supporting member elastically supported by at least one elastic member to elastically support the male connector upwardly; and
a hook assembly to connect with and disconnect from a push-push latching system disposed within the mobile display to attach and detach the peripheral apparatus to and from the mobile display,
wherein the push-push latching system comprises two arms to catch a head portion of the hook assembly to attach the peripheral apparatus to the mobile display.

20. The peripheral apparatus of claim 19, wherein the base further comprises:
fixing brackets extending from each of the hinges to fix the base to the peripheral apparatus; and
a pair of guide protrusions surrounding the hook assembly to be inserted into corresponding guide grooves of the mobile device to support positioning of the mobile device with respect to the peripheral apparatus.

* * * * *